United States Patent
Harting et al.

(10) Patent No.: US 6,203,023 B1
(45) Date of Patent: Mar. 20, 2001

(54) CABLE INLET

(75) Inventors: Dietmar Harting, Espelkamp; Achim Brenner, Lübbecke; Heinz Lambrecht, Lübbecke; Horst Nowacki, Lübbecke; Stephan Schreier, Rahden, all of (DE)

(73) Assignee: Harting KGaA (DE)

( * ) Notice: Subject to any disclaimer, the term of this patent is extended or adjusted under 35 U.S.C. 154(b) by 0 days.

(21) Appl. No.: 09/311,125

(22) Filed: May 13, 1999

(30) Foreign Application Priority Data

May 28, 1998 (DE) .................................................. 198 23 837
Aug. 19, 1998 (DE) .................................................. 198 37 530

(51) Int. Cl.$^7$ .................................................. H01R 15/00
(52) U.S. Cl. ........................ 277/602; 277/590; 277/314
(58) Field of Search .......................... 277/602, 590, 277/314, 604, 449; 439/271; 174/65, 135

(56) References Cited

U.S. PATENT DOCUMENTS

| | | | |
|---|---|---|---|
| 4,367,967 | * | 1/1983 | Albert .................................... 403/41 |
| 5,626,486 | * | 5/1997 | Shelly et al. ........................... 439/281 |
| 5,700,012 | * | 12/1997 | Froehlich et al. ...................... 277/66 |
| 5,977,484 | * | 11/1999 | Jones et al. ............................ 174/135 |

FOREIGN PATENT DOCUMENTS

| | | |
|---|---|---|
| 2 073 508 | 10/1981 | (DE) . |
| 42 30 138 A1 | 3/1994 | (DE) . |
| 43 25 420 A1 | 2/1995 | (DE) . |
| 296 12 407 U1 | 10/1996 | (DE) . |
| 196 15 603 A1 | 10/1997 | (DE) . |

* cited by examiner

*Primary Examiner*—B. Dayoan
*Assistant Examiner*—Frederick Conley
(74) *Attorney, Agent, or Firm*—Cook, Alex, McFarron, Manzo, Cummings & Mehler, Ltd.

(57) ABSTRACT

For a sealing insert of a cable gland it is proposed that the sealing insert be provided with a peripheral step which is adapted to a peripheral step in the pressure screw and that the sealing insert be provided on its outer diameter on the cable insertion side with a conical bevel which is adapted to the conical bevel of the pressure screw, the angle of the bevel of the pressure screw being designed to be more acute relative to the longitudinal axis.

7 Claims, 5 Drawing Sheets

CABLE INLET

Figure 1:
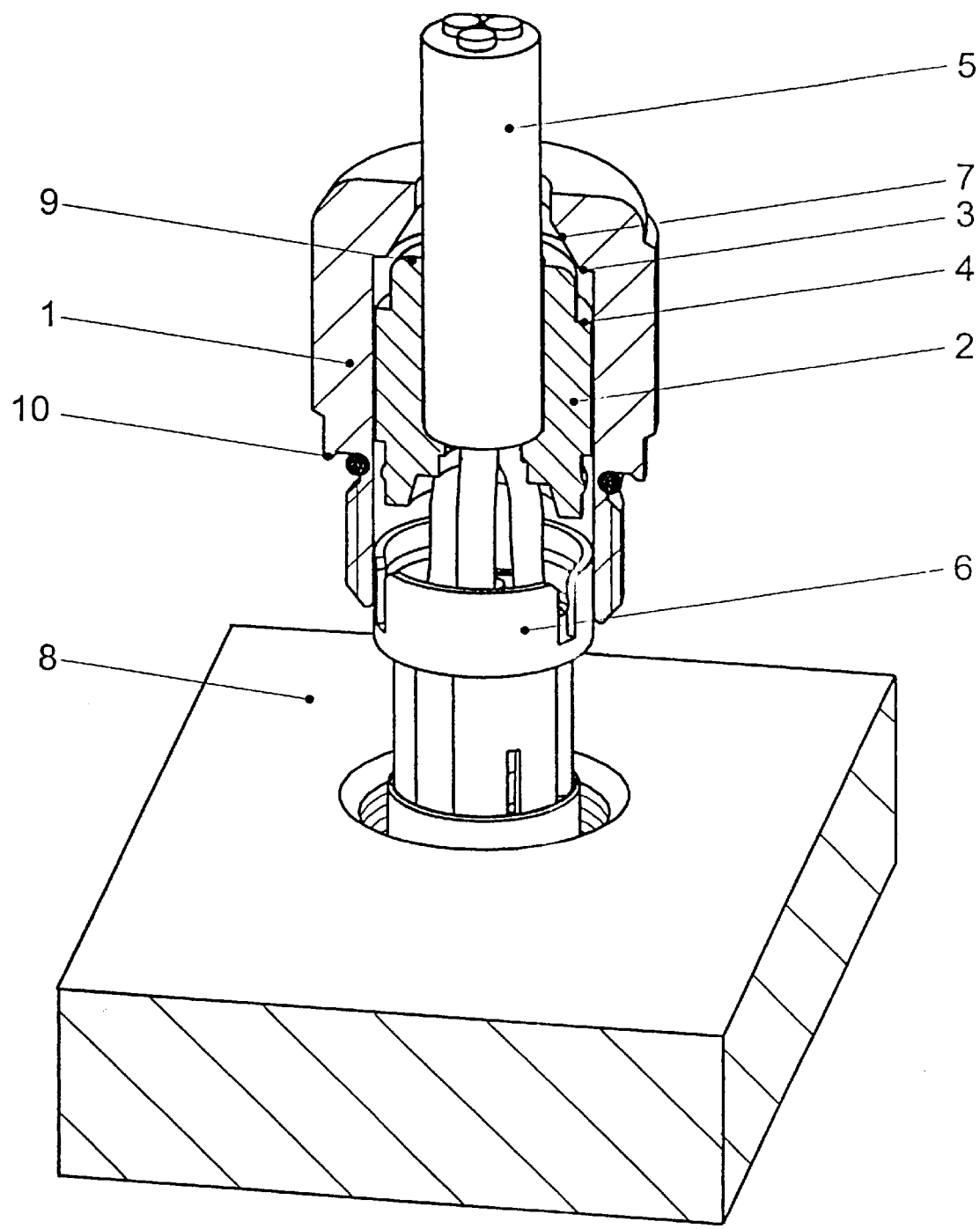

The invention relates to a cable inlet for electric and/or optical cables having at least one electric wire, wherein the wires of the cable are connected to contact elements in accordance with the axial connection method and wherein a pressure screw is provided which can be screwed to an accommodating housing and wherein a sealing insert is provided which can be actuated by the pressure screw.

Such cable inlets provide for the strain relief and sealing of the cable. The strain relief must ensure that no axial tensile strain occurs in the wires, in particular at the connection points of the wires of the cable.

DE 42 30 138 A1 has disclosed a cable inlet for electric cables wherein the cables are connected to axially-contacting contact elements and wherein a pressure screw is provided which can be screwed to an accommodating housing and wherein a sealing insert is provided which can be actuated by the pressure screw.

Additionally, DE 296 12 407 U1 has disclosed a cable inlet for electric cables wherein a pressure screw is provided which can be screwed to an accommodating housing and wherein a sealing insert is provided which can be actuated by the pressure screw. In the case of this cable inlet the sealing insert and pressure screw possess a step.

Additionally, GB 2 073 508 A has disclosed a cable inlet for electric cables wherein a pressure screw is provided which can be screwed to an accommodating housing and wherein a sealing insert is provided which can be actuated by the pressure screw. Here the sealing insert has a stop which is adapted to a step in the pressure screw, and on its outer diameter on the cable insertion side the sealing insert is provided with a bevel which is adapted to a bevel of the pressure screw, the angle of the bevel of the pressure screw being designed to be more acute relative to the longitudinal axis.

Additionally, DE 43 25 420 A1 has disclosed a cable gland for electric cables wherein a slip ring is provided between a pressure screw and a sealing insert.

Additionally, DE 196 15 603 A1 has disclosed a cable gland for electric cables which is provided with contact rings consisting of electrically conductive material for contacting with shielding braiding of the cable.

The known cable inlets are not capable of transmitting axial contacting forces.

The object of the invention is to develop a cable inlet of the type referred to in the introduction such that in addition to its sealing- and strain relief function following the completion of the cable insertion, the sealing insert of the cable inlet also transmits axial forces during the connection and contacting phase.

This object is achieved in that the sealing insert has a peripheral step which is adapted to a peripheral step in the pressure screw and that on its outer diameter on the cable insertion side the sealing insert has a conical bevel which is adapted to a conical bevel of the pressure screw, the angle of the conical bevel of the pressure screw being designed to be more acute relative to the longitudinal axis.

Advantageous developments of the invention are described in claims 2 to 6.

The advantages attained by means of the invention consist in particular in that the sealing and strain relief of a cable inlet normally composed of two parts can be implemented using only one element. Furthermore, due to its structural design the described sealing element is capable of transmitting axial forces.

Figure 2:
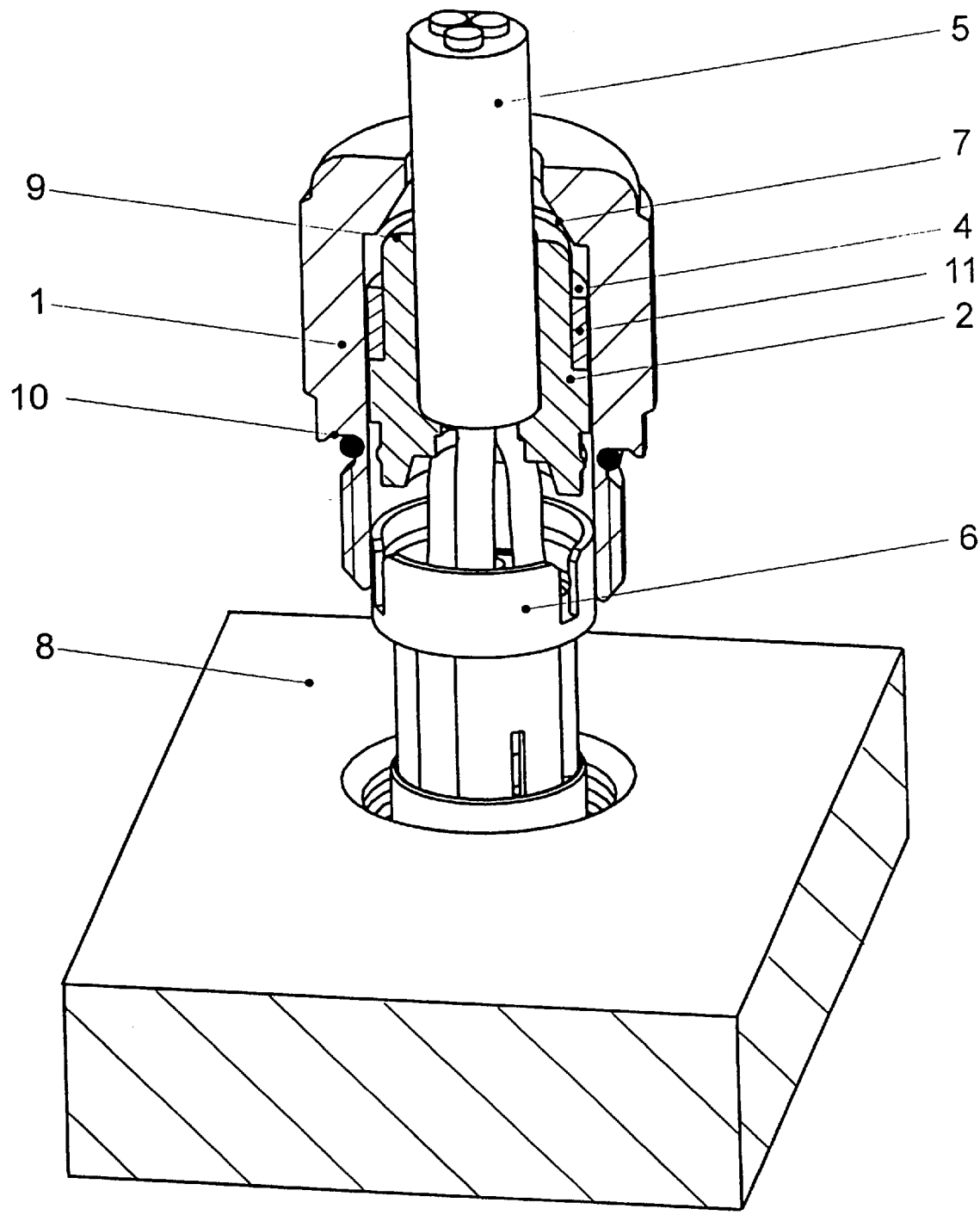
Figure 3:
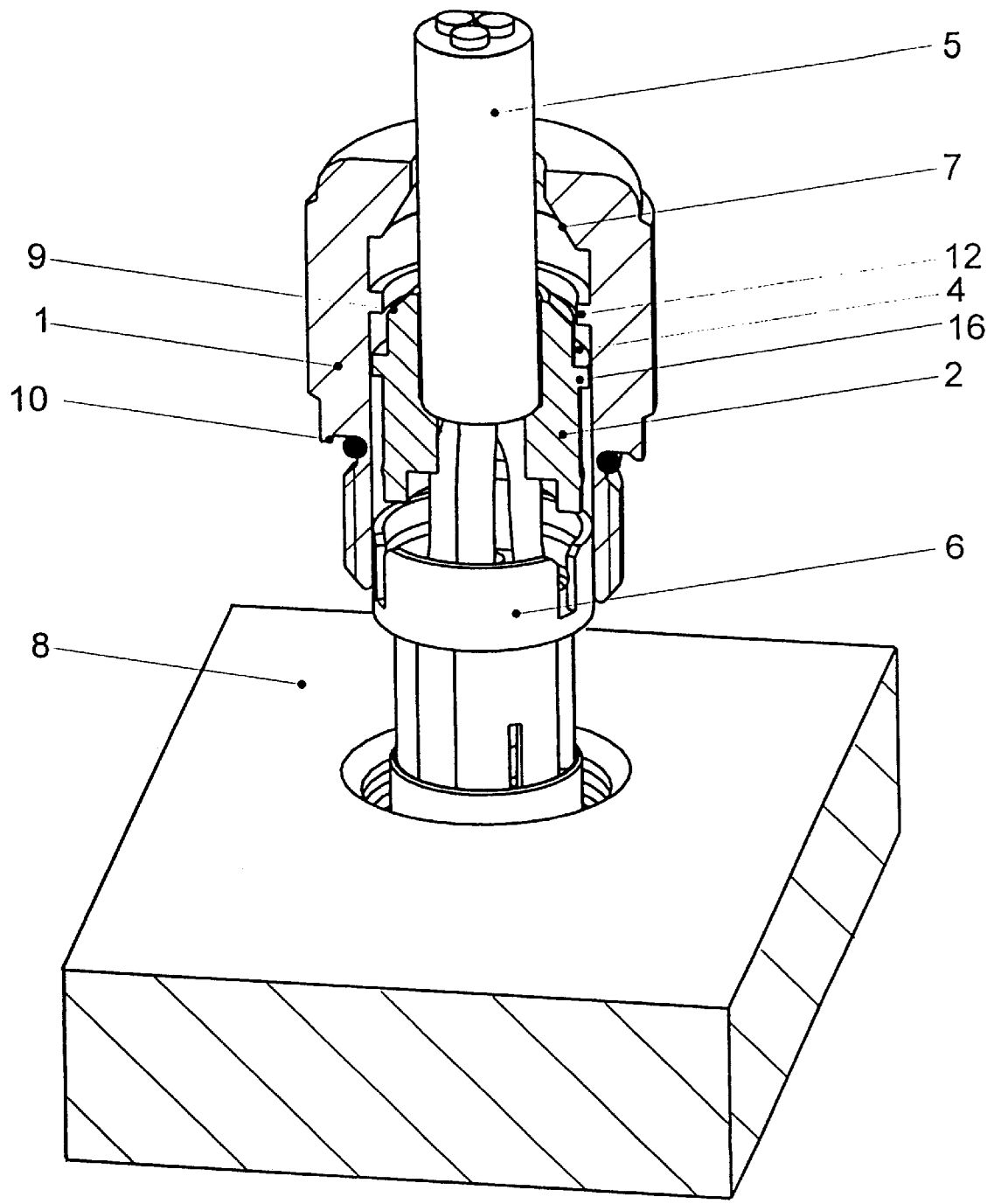
Figure 4:
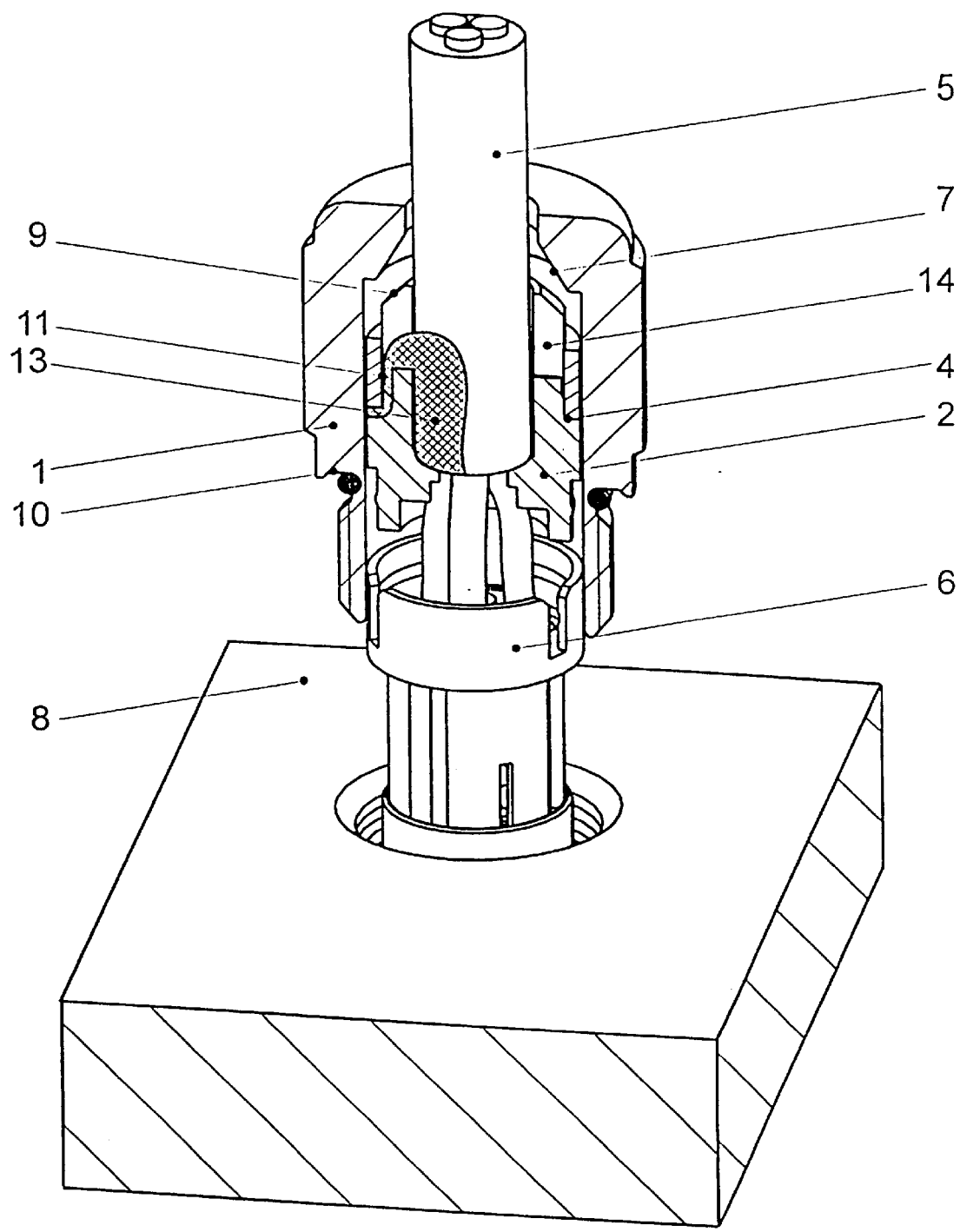
Figure 5:
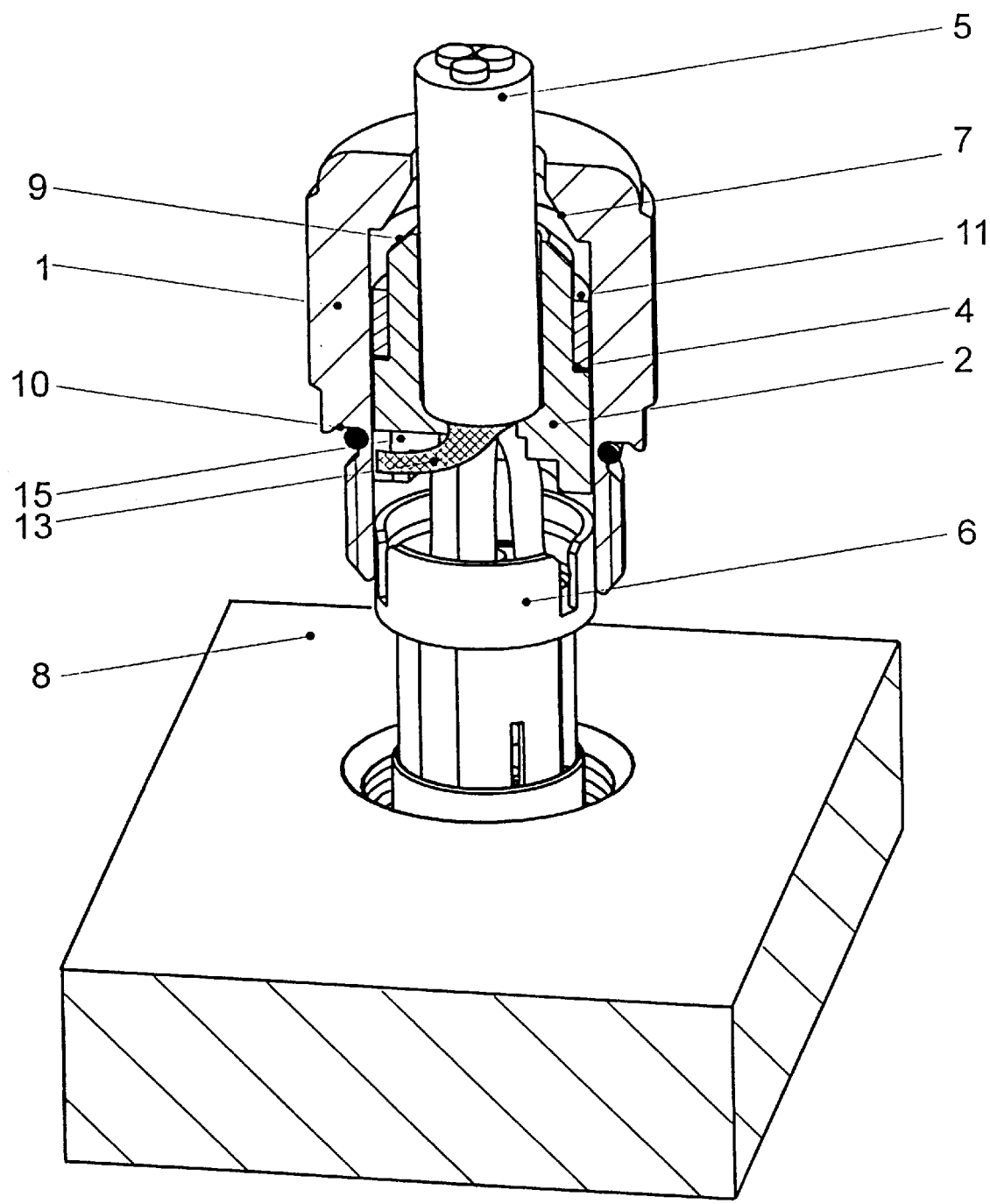

An exemplary embodiment of the invention is illustrated in the drawing and will be explained in detail in the following. In the drawing:

FIG. 1 is a diagram of a cable inlet,
FIG. 2 is a diagram of a cable inlet with a slip ring,
FIG. 3 is a diagram of a modified cable inlet,
FIG. 4 is a diagram of a modified cable inlet for shielded cables, and
FIG. 5 is a diagram of a further modified cable inlet for shielded cables.

As illustrated in FIG. 1, the cable 5 is guided through the pressure screw 1 and the sealing insert 2 to a predetermined depth. Sealing insert 2 and splicing ring 6 are locked to one another. The individual wires extend in the wire guidance channels of the splicing ring 6. The pressure screw 1 is provided internally on the cable insertion side with a preferably conical bevel 7 which abuts against the flexible conical bevel 9 of the sealing insert 2 when the pressure screw is screwed into the housing 8. Here the angle of the conical bevel 7 of the pressure screw is designed to be more acute/steeper than the angle of the conical bevel 9 of the sealing insert relative to the longitudinal axis. The sealing insert 2 is compressed on the cable insertion side and the cable 5 is thus sealed.

During the screwing-in, the step 3 of the pressure screw 1 approaches the step 4 of the sealing insert 2 until the two touch and the transmission of force from pressure screw 1 to splicing ring 6 via the sealing insert 2 commences. This is aided by the fact that the upper part of the sealing insert 2 is designed to be flexible while it is difficult to deform the lower part for the force transmission. The splicing ring 6 thus is displaced axially whereby the insulation piercing connectors axially penetrate the conductor guidance channel and contact the conductors of the cable 5.

The pressure screw 1 is screwed into the housing 8 up to the stop 10, whereby the splicing ring 6 assumes a defined position and ensures the contacting.

As illustrated in FIG. 2, in order to reduce the friction forces it is possible to apply a slip ring 11 to the sealing insert 2, said slip ring 11 having a distinctly lower friction coefficient in association with the pressure screw 1. Here the slip ring is arranged such that its upper side forms the step 4 of the sealing insert, i.e. the side of the slip ring facing towards the step 3 of the pressure screw 1 forms a step 4.

Additionally, the pressure screw 1 can be designed in accordance with FIG. 3, where an additional annular projection 12 is provided in the pressure screw 1. Upon screwing into the housing 8, said projection 12 presses against an annular projection 16 of the sealing insert 2, whereby the axial displacement of sealing insert 2 and splicing ring 6 up to the stop of the pressure screw 10 in the housing 8 is implemented. Here the surface of the projection 16 facing towards the cable insertion side has the form of a step 4. Upon further screwing-in, the projection 16 of the sealing insert 2 is deformed such that the additional projection 12 of the pressure screw can move past the projection of the sealing insert 2. The bevel 7 on the cable insertion side of the pressure screw 1 now abuts against the flexible bevel 9 of the sealing insert 2 whereby the sealing insert is compressed such that its inner diameter is reduced and the cable 5 is sealed externally at the cable insulation.

As illustrated in FIG. 4, the slip ring 11 can also consist of electrically conductive material, which offers the advantage that a shielded cable can be connected. In this embodiment the shielding braiding 13 is arranged inside the sealing insert 2 and is conducted outwards through the sealing insert provided with one or more slots 14 on the cable insertion side. The slip ring 11 is applied via the cable 5 and shielding braiding to the sealing insert 2. The screwing-on of the pressure screw 1 establishes the electric contact between the pressure screw 1 and the shielding braiding via the slip ring 11.

The shielding contacting to the housing 8 is effected by screwing an electrically conductive pressure screw 1 into an electrically conductive housing or an electrically conductive threaded insert via which an electrical connection to an earth terminal of a non-conductive plastics housing is then established.

As illustrated in FIG. 5, the sealing insert 2 can also be provided with one or more slots 15 on the side facing towards the splicing ring 6, in which case the shielding braiding 13 then is conducted outwards through said slot(s) and the electric contact with the pressure screw 1 is assured by the splicing ring 6.

The cable employed in the cable inlet described in the foregoing can be an electric cable optionally provided with shielding or also an electro-optical cable (hybrid cable), which latter contains at least one electric wire in addition to optical wires.

What is claimed is:

1. A cable inlet for electric and/or optical cables having at least one electric wire, wherein the wires of the cable are connected to contact elements in accordance with the axial connection method and wherein a pressure screw is provided which can be screwed to an accommodating housing and wherein a sealing insert is provided which can be actuated by the pressure screw, characterized in that the sealing insert (2) has a peripheral step (4) which is adapted to a peripheral step (3) in the pressure screw (1) and that a sealing insert outer diameter on an end facing the pressure screw has a conical bevel (9) which is adapted to a conical bevel (7) of the pressure screw (1), the angle of the conical bevel (7) of the pressure screw (1) being designed to be more acute relative to the longitudinal axis.

2. A cable inlet according to claim 1, characterized in that a slip ring (1) is applied to the sealing insert (2), the side of the slip ring facing towards the step (3) of the pressure screw (1) having the form of a step (4).

3. A cable inlet according to claim 1, characterized in that the pressure screw (1) is provided internally with an annular projection (12), that the sealing insert (2) has an annular, flexible projection (16) whose surface facing towards the pressure screw has the form of a step (4) and that when the pressure screw is screwed on, the pressure screw projection (12) snaps over the sealing insert projection (16).

4. A cable inlet according to claim 2, characterized in that the sealing insert (2) has at least one axial slot (14), that the slot (14) is provided on the side facing towards the pressure screw, and that the slip ring (11) consists of electrically conductive material.

5. A cable inlet according to claim 2, characterized in that the sealing insert (2) has at least one axial slot (15) which is provided on the side facing towards a splicing ring (6), and that the slip ring (11) consists of electrically conductive material.

6. A cable inlet according to claim 2, characterized in that the sealing insert (2) consists of plastics material and is provided with an electrically conductive surface.

7. A cable inlet for electric and/or optical cables having at least one electric wire, wherein the wires of the cable are connected to contact elements in accordance with the axial connection method and wherein a pressure screw is provided which can be screwed to an accommodating housing and wherein a sealing insert is provided which can be actuated by the pressure screw, characterized in that the sealing insert (2) has a peripheral step (4) which is adapted to a peripheral step (3) in the pressure screw (1) and that a sealing insert outer diameter on an end facing the pressure screw has a conical bevel (9) which is adapted to a conical bevel (7) of the pressure screw (1), the angle of the conical bevel (7) of the pressure screw (1) being designed to be more acute relative to the longitudinal axis, further characterized in that the pressure screw (1) is provided internally with an annular projection (12), that the sealing insert (2) has an annular, flexible projection (16) whose surface facing towards the pressure screw has the form of a step (4) and that when the pressure screw is screwed on, the pressure screw projection (12) snaps over the sealing insert projection (16).

* * * * *